W. A. WICKS.
Machines for Seaming Sheet-Metal Cans.
No. 6,126. Reissued Nov. 10, 1874.
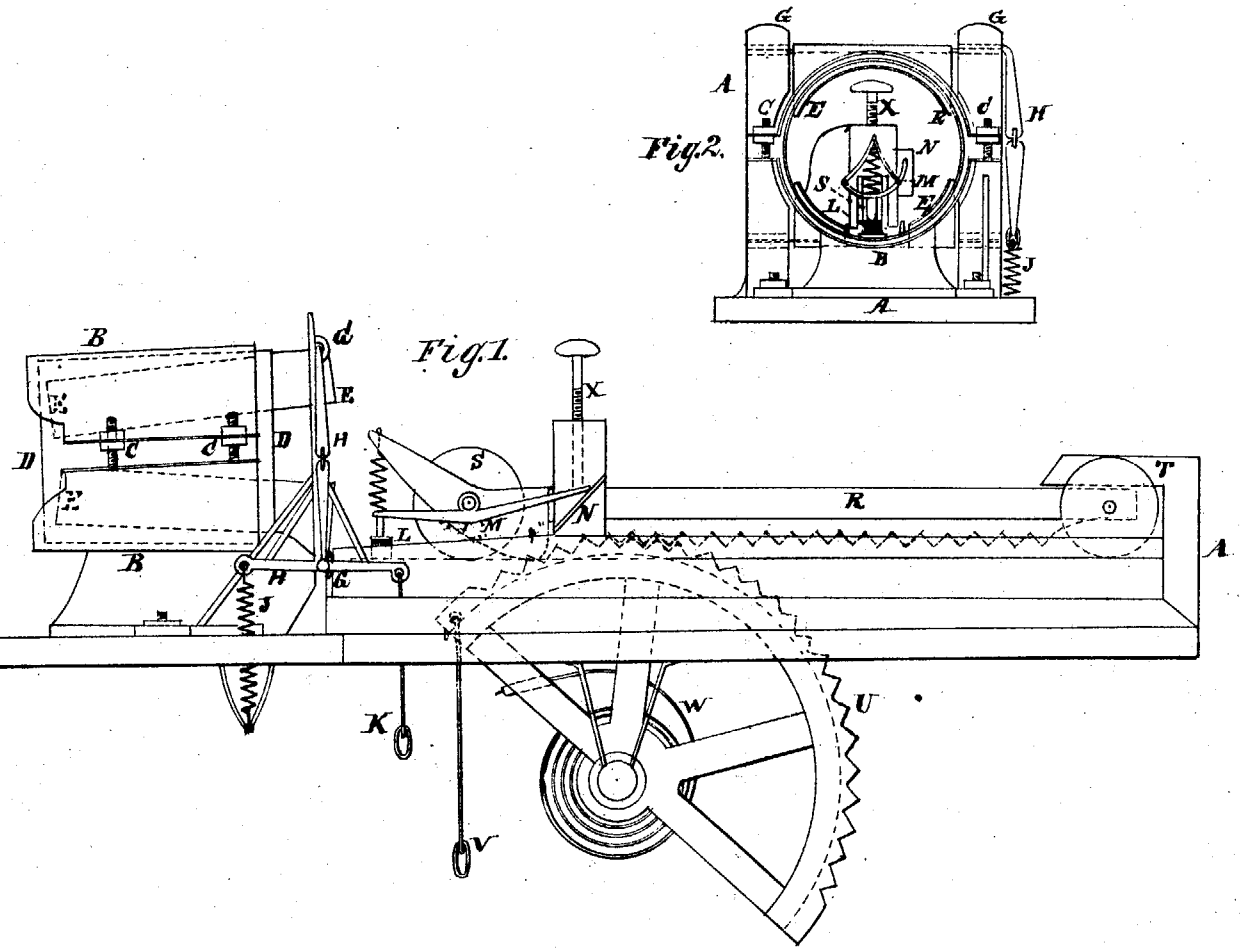
Witnesses:
Chas. A. Pettit
F. H. Robertson
Inventor:
Wm. A. Wicks
PER. [illegible]
Attorneys.
N. PETERS, PHOTO-LITHOGRAPHER, WASHINGTON, D. C.

UNITED STATES PATENT OFFICE.

WILLIAM A. WICKS, OF BALTIMORE, MARYLAND.

IMPROVEMENT IN MACHINES FOR SEAMING SHEET-METAL CANS.

Specification forming part of Letters Patent No. 105,398, dated July 12, 1870; reissue No. 6,126, dated November 10, 1871; application filed June 28, 1872.

*To all whom it may concern:*

Be it known that I, WILLIAM A. WICKS, of the city of Baltimore, county of Baltimore and State of Maryland, have invented a new and Improved Machine for Making the Seams of Sheet-Metal Cans, and for regulating the size thereof, of which the following is a specification:

Figure 1 represents a side elevation of the machine; Fig. 2, a front view of the cylinder, with the tin can on the inside, and also the clamps or jaws for holding the can against the inside of said cylinder while the seam of the can is being soldered; also, the brush that automatically places or strews the rosin or other flux along the seam of the can.

To give a clearer idea of what the invention consists of, I will proceed to describe the construction and operation of the machine.

The nature of my invention is found in the mode of making the seam or upright joints of sheet-metal cans by soldering on the inside instead of the outside, and the mode of gaging or sizing the body of the can from the outside instead of from the inside, by means substantially as hereinafter described. The clamps or jaws operate to press the can firmly against the inner side of the cylinder, thus insuring a uniform size of can. The roller moving back and forth over the seam, by means of a treadle, rack, and coiled spring underneath, has the effect to smooth out and conform the tin to the cylinder. The brush, by being automatically dipped in the rosin, (not shown,) rises by means of the little spiral attached to it, and deposits the flux along the length of the seam. A common heated soldering-iron is then used with a bit of solder to make or solder the seam.

The object of my invention then is, first, to gage or size the bodies of sheet-metal cans from the outside instead of the inside, so as to insure a fit of the separately-prepared tops and bottoms; second, to make or solder the seam on the inside instead of the outside, to enable the melted solder to flow more readily between the lap-joint that constitutes the seam.

By these improvements a uniform fit for top or bottom is obtained, and a smooth, strong seam is made with less metal than by the present method.

By sizing the can inside of a cylinder, cans of all thicknesses of tin are made uniform in size on outside, and by making the seam on the inside much less solder can be used, on account of the favorable position for soldering.

A represents the frame that supports the devices; B, the cylinder; C C, regulating-screws to increase or diminish the size of same. Inside the cylinder B the tin D, or metal for the body of the can, is placed, and gaged or sized by the dimensions thereof, the edges or seam of the can D being at the lower side and slightly overlapping, ready to be soldered. The body of the can is thus sized by outside gaging, and the seam of the same made by inside soldering. Longitudinal clamps E E, pivoted at G G, with toggle-joint at H, are acted on by the spiral J, and made to press the can-body against the inside of cylinder. A downward pull at K releases the clamps E E, and the can is removed. L is an upright spring-brush, operated by the pivoted lever M, one end of which, falling upon the incline N, plunges the brush into the flux. As the roller moves forward, the spring lifts the brush, and deposits the flux on the seams. The roller S, pivoted in front end of traveling rack R, serves to flatten the seam before soldering. The roller may be grooved or flanged on its periphery, so as to countersink the seam, thus bringing the double thickness on the inside, leaving the outside perfectly smooth. The traveling rack R is kept in place by a side guide, and moves on two rollers, T T, at the rear end of the rack. A semicircular toothed wheel, U, gears into the rack R, and moves it forward by means of the treadle V. The coiled spring W, attached to the axle and side of the half-wheel U, returns the rack. The pressure upon the roller is regulated by the screw X.

Having thus described my invention, what I claim as new, and desire to secure by Letters Patent, is—

1. The two-part cylinder B, adjustable to and about the can-blank, and regulating the outside circumference thereof, as and for the purpose described.

2. The spring-hinged clamp or holder E, applied on the inside of can-blank, and in combination with an outside gage-cylinder, B, as and for the purpose set forth.

3. An inside clamp, E, opened longitudinally over the lapped edges of can-blank, and allowing the seam to be soldered on the inside of can against the cylindrical gage A, as described.

4. The spring-pressed reciprocating brush L, attached to a pivoted and traveling stock, M, combined with can-holder and rosin-reservoir, as and for the purpose set forth.

5. The reciprocating roller S, constructed and applied in a can sizing or soldering machine, as and for the purpose set forth.

WILLIAM A. WICKS.

Witnesses:
HENRY CASHMYER,
F. ALEXANDER TAYLOR.